United States Patent [19]
Masand

[11] Patent Number: 6,131,092
[45] Date of Patent: Oct. 10, 2000

[54] SYSTEM AND METHOD FOR IDENTIFYING MATCHES OF QUERY PATTERNS TO DOCUMENT TEXT IN A DOCUMENT TEXTBASE

[76] Inventor: Brij Masand, 10 Country Corners Rd., Wayland, Mass. 01778

[21] Appl. No.: 08/274,123

[22] Filed: Jul. 12, 1994

Related U.S. Application Data

[63] Continuation of application No. 07/926,877, Aug. 7, 1992, abandoned.

[51] Int. Cl.[7] .................................................. G06F 17/21
[52] U.S. Cl. ...................... 707/6; 707/3; 707/5; 707/500
[58] Field of Search ...................... 395/600; 364/DIG. 1, 364/DIG. 2; 707/3, 5, 6, 500

[56] References Cited

U.S. PATENT DOCUMENTS

| | | | |
|---|---|---|---|
| 3,568,156 | 3/1971 | Thompson | 395/800 |
| 4,450,520 | 5/1984 | Hollaar | 395/550 |
| 4,451,901 | 5/1984 | Wolfe | 395/600 |
| 4,495,566 | 1/1985 | Dickinson et al. | 364/200 |
| 4,625,295 | 11/1986 | Skinner | 395/800 |
| 4,674,066 | 6/1987 | Kucera | 364/900 |
| 4,961,152 | 10/1990 | Davis | 395/13 |
| 5,051,947 | 9/1991 | Messenger | 395/800 |
| 5,131,054 | 7/1992 | Smith | 382/27 |
| 5,297,280 | 3/1994 | Potts, Sr. et al. | 395/600 |
| 5,331,554 | 7/1994 | Graham | 364/419.07 |

*Primary Examiner*—Jean R. Homere
*Attorney, Agent, or Firm*—Cesari and McKenna, LLP

[57] ABSTRACT

A text pattern matching system locates documents whose text patterns satisfy selected criteria as set forth in a query. The system represents text as a series of symbols, each representing a word, number, or other searchable feature. A query also comprises a series of symbols, which also represent a word, number or other searchable feature. In one embodiment, the symbols of the documents and queries are represented by text tokens and query tokens, respectively. The system initially performs a sort to order all tokens according to symbol, and generates a match token for each text token that has the same symbol as a query token. The system then sorts the match tokens to order them according to query and query-symbol order, and then searches through the match tokens to identify series associated with documents, for which the match tokens were generated, which identify series of symbols which satisfy the search criteria.

15 Claims, 9 Drawing Sheets

TOKEN STRUCTURE

| | | |
|---|---|---|
| 30 | SYMBOL | SYMBOL IDENT 20 |
| 31 | SYMBOL ID | |
| 32 | DOC PTR | DOC/QUERY TEXT ID 21 |
| 33 | DOC SEGMENT PTR | |
| 34 | DOC SEG OFFSET PTR | |
| 35 | MATCH PREDICATE | |
| 40 | QUERY TOKEN FLAG | QUERY INFO 22 |
| 41 | BEGIN PATTERN FLAG | |
| 42 | END PATTERN FLAG | |
| 43 | BEGIN LABEL FLAG | |
| 44 | END LABEL FLAG | |
| 45 | PROXIMITY INDICATOR | |
| 50 | MATCH TOKEN FLAG | MATCH INFO 23 |
| 51 | MATCH DOC PTR | |
| 52 | MATCH SEG PTR | |
| 53 | MATCH DOC SEG OFF PTR | |

TOKEN STRUCTURE

| 30 | SYMBOL | SYMBOL IDENT 20 |
| --- | --- | --- |
| 31 | SYMBOL ID | |
| 32 | DOC PTR | DOC/QUERY TEXT ID 21 |
| 33 | DOC SEGMENT PTR | |
| 34 | DOC SEG OFFSET PTR | |
| 35 | MATCH PREDICATE | |
| 40 | QUERY TOKEN FLAG | QUERY INFO 22 |
| 41 | BEGIN PATTERN FLAG | |
| 42 | END PATTERN FLAG | |
| 43 | BEGIN LABEL FLAG | |
| 44 | END LABEL FLAG | |
| 45 | PROXIMITY INDICATOR | |
| 50 | MATCH TOKEN FLAG | MATCH INFO 23 |
| 51 | MATCH DOC PTR | |
| 52 | MATCH SEG PTR | |
| 53 | MATCH DOC SEG OFF PTR | |

FIG. 2

SYSTEM AND METHOD FOR IDENTIFYING MATCHES OF QUERY PATTERNS TO DOCUMENT TEXT IN A DOCUMENT TEXTBASE

This is a continuation of application Ser. No. 07/926,877 filed on Aug. 7, 1992, now abandoned.

FIELD OF THE INVENTION

The invention relates generally to the field of digital computer systems, and more particularly to systems and methods using digital computer systems for locating text patterns in documents which match query text patterns.

BACKGROUND OF THE INVENTION

Digital computers are often used to identify documents which contain particular textual elements such as words or phrases. Typically, an operator searching through a "document base" will be trying to identify those documents in the document base which are directed to particular topics. The topics will be characterized by one or more search queries, each of which contains a word, a phrase of one or more words comprising a text string, a relation of one word in a selected proximity relationship to another word or phrase, or the like.

In a conventional serial computer, a search in response to a query may proceed in a number of ways. In one way, the computer may, for each document in the document base, try to perform an initial search in which it compares the first word in the query, $QW_1$, with each successive word $DW_i$ in the document. When the computer finds a word $DW_I$ in the document which matches the first word $QW_1$ of the query, it proceeds to compare the successive words $DW_{i+k}$ in the document against the successive words $QW_{1+k}$ in the query, for each index "K," and if they compare positively, the document is identified as one which meets the query. On the other hand, if the computer determines that a word $DW_{i+K}$ in the query document does not favorably compare to the corresponding word $QW_{1+K}$ in the search query, it resumes the initial search with the word $DW_{i+1}$ in the document text, following the one which gave rise to the previous initial match, comparing it with the first word $QW_1$ of the query. The computer may perform similar operations if the query requests identification of documents in which a word has a selected proximity relationship to another word or phrase, except that it may not perform the comparison with respect to each subsequent word of the document, but only with respect to words which have the required proximity relationship to the first word of the query.

On a conventional serial computer, the search mechanism described above can be very time-consuming, and other mechanisms have been developed to speed up searching. In one well-known arrangement, the computer initially establishes inverted index files, in which the words which can be searched are listed in, for example, alphabetical order. Accompanying each word are pointers which identify the particular documents which contain the word as well as the location in each document at which the word occurs. To perform a search, instead of scanning through the documents in word order, the computer locates the pointers for the particular words identified in the query and processes them to identify the documents in which they have the required order or proximity relationship. This mechanism is generally faster than in the previously-described serial document search mechanism, but it can still be slow.

More recently, massively parallel computers have been developed which incorporate a large number of processing elements which perform processing generally in parallel. In an adaptation of the serial document search mechanism, the document base is divided among the processing elements, and a control processor broadcasts the query words of the query the processing elements. The processing elements perform the comparison operations in a manner similar to that described above with respect to the serial computer. This mechanism is feasible when the query length or rate, that is, the number to be processed per unit time, is relatively small, but can become unwieldy for long queries or if the query rate is large. If the amount of text in the document base is small, it may be more efficient to store the queries in the processing elements and broadcast the document base to the processing elements. However, neither of these mechanisms is efficient when both the document base and the number of queries is large.

SUMMARY OF THE INVENTION

The invention provides a new and improved text pattern matching system and method.

In brief summary, the text pattern matching system locates documents whose text patterns satisfy selected criteria as set forth in a query. The system represents text as a series of symbols, each representing a word, number, or other searchable feature. A query also comprises a series of symbols, which also represent a word, number or other searchable feature. In one embodiment, the symbols of the documents and queries are represented by text tokens and query tokens, respectively. The system initially performs a sort to order all tokens according to symbol, and generates a match token for each text token that has the same symbol as a query token. The system then sorts the match tokens to order them according to query and query-symbol order, and then searches through the match tokens to identify series associated with documents, for which the match tokens were generated, which identify series of symbols which satisfy the search criteria.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 is a diagram depicting the data structure for a document text token, a query token and a match token, all of which are used by the text pattern matching system in identifying matches of query patterns in document text in a document textbase;

DETAILED DESCRIPTION OF AN ILLUSTRATIVE EMBODIMENT

Figure 1:
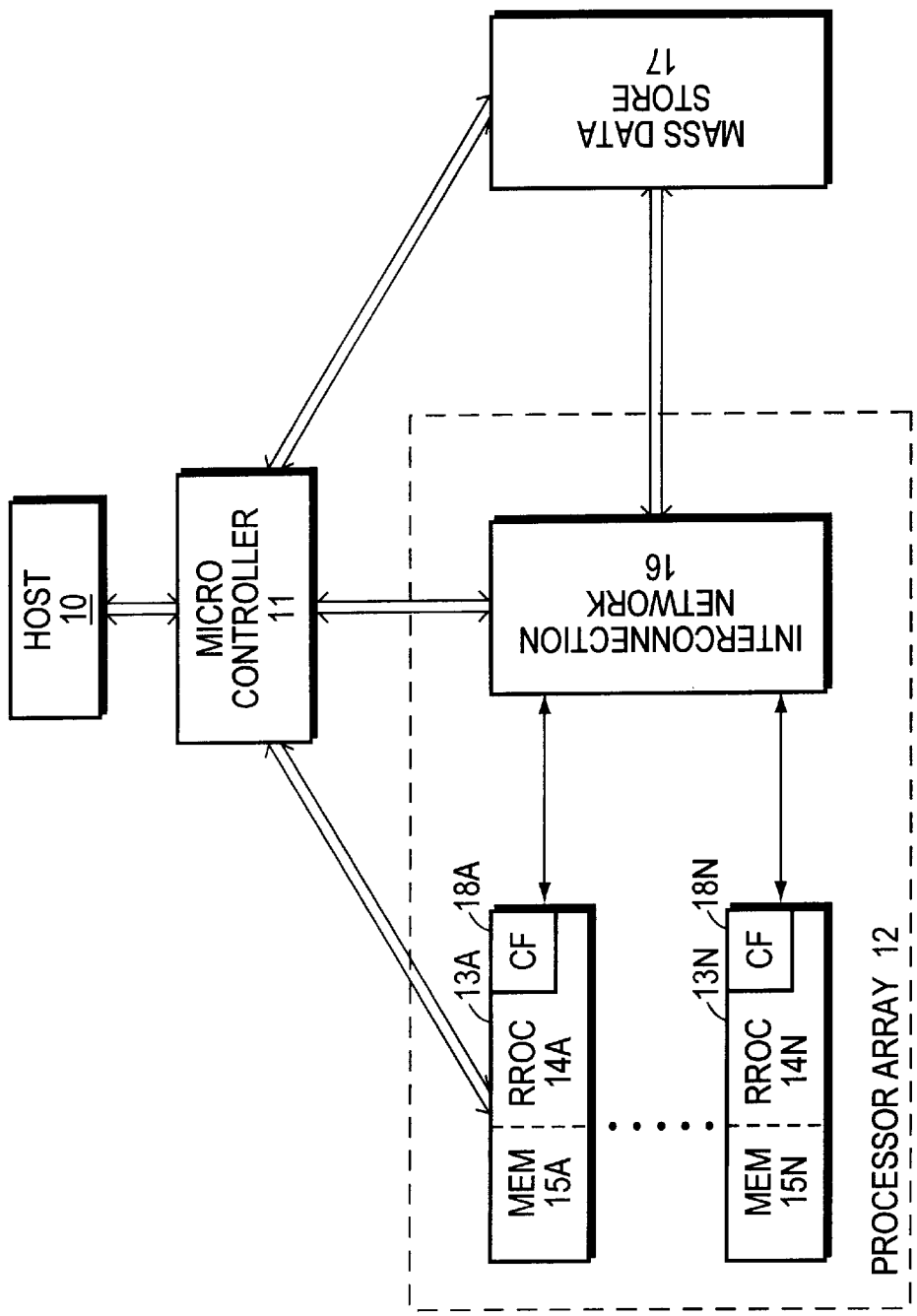
FIG. 1 is a general block diagram depicting a massively-parallel computer which comprises a portion of one embodiment of the text pattern matching system.

FIG. 1 is a general block diagram depicting a massively-parallel computer which comprises a portion of one embodiment of the text pattern matching system according to the invention. With reference to FIG. 1, a massively-parallel computer in one embodiment includes a host 10 which transmits commands to a micro-controller 11 to control processing by a processor array 12. The processor array 12 includes a plurality of processing elements 13A through 13N [generally identified by reference numeral 13($i$)], each including a processor 14($i$) and a memory 15($i$).

The massively-parallel computer depicted in FIG. 1 operates generally in a "SIMD," or "single-instruction/multiple-data," manner. In SIMD, the micro-controller 11 transmits control signals that enable the processors 14($i$) to, in parallel, process items of data in their respective memories 15($i$). In one embodiment, the addresses of the locations in the memories 15($i$) to be processed by the processors 14($i$) can be selectively provided either by the micro-controller 11 or they may be generated and maintained locally at each of the processors 14($i$). The control signals provided by the micro-controller can enable the processors 14($i$) to use either the locally-generated addresses or addresses provided by it in identifying the locations containing data to be processed.

In addition, processing by particular ones of the processors 14($i$) can be conditioned on results of previous processing. In particular, each processor 14($i$) includes a context flag 18A through 18N [generally identified by reference numeral 18($i$)] that the processor 14($i$) can, when enabled by the micro-controller 11, set or clear in response to its processing. The micro-controller 11 can condition processing by each of the processors 14($i$) in response to the condition of the respective context flag 18($i$).

The processor array also includes an interconnection network 16 which, under control of the micro-controller 11, transfers data among the processing elements 13($i$) and between the processing elements 13($i$). Each processing element 13($i$) is identified by an identifier, which also serves as an address in the interconnection network. When one processing element 13(I) needs to send data to another processing element 13(J), it does so in a message which identifies the recipient processing element 13(J).

One embodiment of the massively-parallel computer also includes a mass data store 17. In one embodiment, the mass data store 17 generally stores data from the processing elements 13($i$) organized in rows. That is, the mass data store 17 stores, in a group of successive storage locations, an item from all processing elements 13($i$), with successive groups storing differing items. In that embodiment, a unit of storage in the mass data store 17 effectively comprises a group of storage locations in the mass data store 17, organized so that the mass data store 17 transfers an integral number of items to the processing elements 13($i$) in one transfer operation. It will be appreciated that the data in other embodiments of the mass data store 17 may be organized in a number of ways, and that a text pattern matching system in accordance with the invention may be implemented in a massively parallel computer which does not include a mass data store.

It will be appreciated that the number of physical processing elements in an actual massively-parallel computer will be fixed, which places a maximum on the number of data items which can be processed in parallel. However, in one embodiment the micro-controller 11 may effectively enable the physical processing elements to emulate a plurality of processing elements, termed "virtual processors," each represented by a data item. The micro-controller 11 enables the physical processing elements to, in parallel, serially perform each processing operation in connection with the data items associated with each virtual processor. Unless otherwise specified, "processing element 13($i$)" will refer either to both a physical processing element and to a virtual processing element. In that embodiment, each virtual processor has an identifier which uniquely identifies it among other virtual processors; in one embodiment the virtual processor identifier has a high-order portion which corresponds to the identifier of the physical processing element which emulates the particular virtual processor, and a low order portion which identifies the virtual processor among the virtual processors emulated by the physical processing element.

The text pattern matching system in accordance with the invention includes a document base which includes the text of typically a large number of documents ("document text") each containing text in the form of words, numbers or other symbols. The text pattern matching system receives queries, each including text ("query text"), which request the identification of documents which contain document text which corresponds to the query text. A query may contain a query text string, for example, a series of words, numbers and/or other symbols, and ask for the identification of documents which contain the same text string. Alternatively, a query may ask for identification of documents which contain any of the symbols of the query text, or documents which contain symbols within a selected proximity, as selected in the query, of other symbols.

The operation of the text pattern matching system will be described in detail in connection with the flow charts in FIGS. 3A through 5B. Before proceeding to FIG. 3A, it would be helpful to describe a data structure, identified as a token, which is used by one embodiment of the text pattern matching system. The text pattern matching system represents the document base and each query as in the form of tokens. With respect to the document base, each document is represented by a series of text tokens, and each query is represented by one or more query tokens. In addition, as will be described below in connection with FIGS. 3A and 3B, during processing of a query, the text pattern matching system may establish one or more match tokens indicating symbols represented by text tokens that correspond to the query tokens. The data structure of the text tokens, query tokens and match tokens is the same, and will be described in connection with FIG. 2.

With reference to FIG. 2 a token includes four general sections, including a symbol identification portion 20, a document/query text identification portion 21, a query information portion 22 and a match information portion 23. The symbol information portion 20 includes information about a specific symbol, that is, the word, number or other symbol, represented by the token. In one embodiment, the symbol identification portion 20 includes two fields, namely, a symbol field 30 and a symbol identification field 31. The symbol field 30 contains the actual symbol represented by the token, which may be encoded in, for example, standard ASCII code. The symbol identification field 31 contains a value which uniquely identifies the symbol within a range of values. For example, if the symbol field 30 contains the symbol in ASCII form, the field may contain successive ASCII codes for the successive letters or digits forming the word or number, and thus may be of variable length, which may be truncated if the symbol is longer than a predetermined maximum length. On the other hand, the symbol identification field may contain an offset value into a dictionary containing the different symbols which the documents may contain, which offset value may be of fixed length.

The document/query text identification portion 21 contains a number of fields which identify, in a text token, the document and location in the document at which the symbol represented by the token is located. In a query token and a match token, the document/query text identification portion includes, in the same fields, the query and location in the query at which the symbol represented by the token is located. With reference to FIG. 2, the document/query text identification portion 21 includes a document pointer field 32, a document segment pointer field 33, a document segment offset pointer 34 and a match predicate pointer 35. In a text token, the document pointer field 32 identifies the document, the document segment pointer 33 identifies a segment, such as a paragraph, table or a page, and the document segment offset pointer 34, such as the offset into the paragraph, table or page, at which the symbol is located. For a query token or a match token, the document pointer field 32 identifies the query, and the document segment pointer 33 and segment offset pointer 34 identify the offset into the query string or series of query symbols at which the particular query symbol represented by the query token is located. In text tokens, the match predicate field 35 may contain further information concerning the symbol represented by the token, including whether the symbol is capitalized, whether it is punctuation, and so forth. In one embodiment, in the query tokens and match tokens the match predicate field 35 is empty.

The query information field 22 contains information about the query token. In particular, a query token flag 40 will be set if the token is a query token. For text tokens and match tokens, the query token flag 40 will be clear. A begin pattern flag 41 and an end pattern flag 42 are conditioned in query tokens and match tokens to indicate the beginning and end, respectively, of a symbol string. In a query relating to a symbol string, the begin pattern flag 41 of the token representing the first symbol in the symbol string will be set, and the end pattern flag 42 of the token representing the last symbol in the symbol string will also be set, and otherwise the flags 41 and 42 will be clear. If a symbol string consists of one symbol, both the begin and end pattern flags 41 and 42 of the query token will be set. The text pattern matching system can use the contents of the document/query text identification portion 21 to identify the set of query tokens representing the series of symbols in the query's symbol string.

The text pattern matching system further facilitates use of queries which are labeled, that is, they contain further information concerning the query which may be useful to an operator or a computer program which generated the token, but which information may not be represented by symbols which are themselves used by the text pattern matching system. The query information portion 22 includes two fields, namely, a begin label flag 43 and an end label flag 44, which are used to identify the first and last query token associated with a labeled query. The text pattern matching system may use the contents of the document/query text identification portion 21 to identify the series of query tokens representative of the query.

Finally, the query information portion 22 includes a proximity indicator field 45 which may contain proximity information for the query. For example, if a query requests identification of documents in which two symbols are within a selected proximity, or number of symbols, of each other, the proximity indicator field 45, in both a query token and a match token, can contain that proximity information.

The match information portion 23 also contains a number of fields. A match token flag 50, if set, identifies the token as being a match token. In addition, the match information portion includes a match document pointer field 51, a match segment pointer field 52 and a match offset pointer field 53, which contain information which the text pattern matching system copies from fields 32 through 34, respectively, of a text token when it establishes the match token. Thus, fields 51 through 53 identify the document, segment and offset of the text token for which text pattern matching system establishes the match token. A match token, as described above, contains in fields 32 through 34 of its document/query text identification portion 21 information which associates the match token with a particular query and symbol, and further contains in fields 51 through 53 of its match information portion 23 information which associates the match token with a particular document and symbol.

An operator may provide the text pattern matching system with query tokens directly. However, in one particular embodiment, the host 10 itself will generate query tokens in response to queries which are provided thereto in a particular query language. A description of the correspondence between particular forms of queries and particular match tokens or sequences of match tokens that may be generated in response thereto will be presented after the text pattern matching system is described.

Figure 3A:
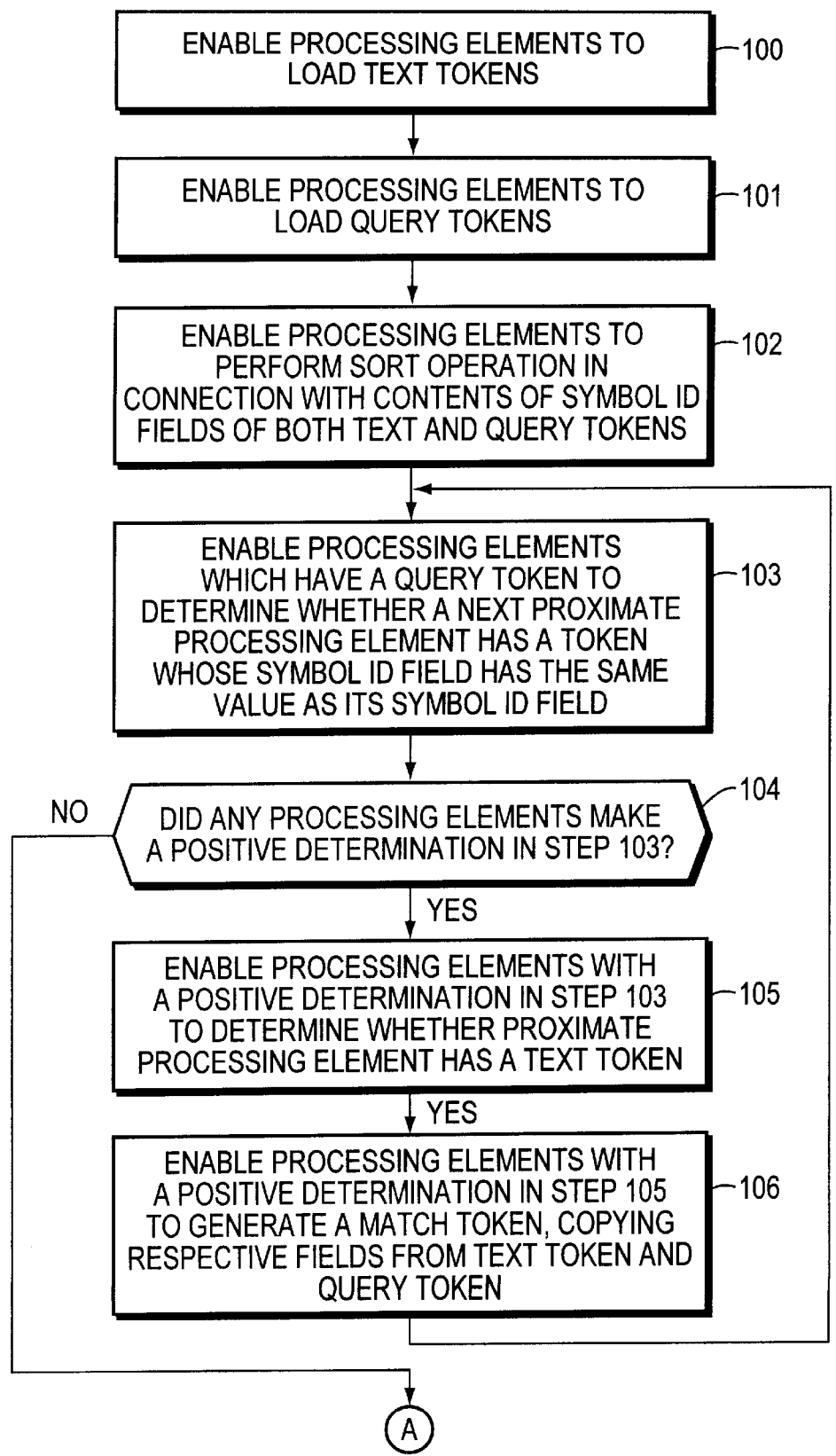
FIGS. 3A and 3B together contain a flow diagram that illustrates operations performed by the massively-parallel computer depicted in FIG. 1 in identifying matches of query patterns in document text in a document text base, illustrating in detail the generation of match tokens in response to document text tokens and match tokens, each match token indicating the correspondence between a symbol in the query pattern and a symbol in the document textbase.
Figure 3B:
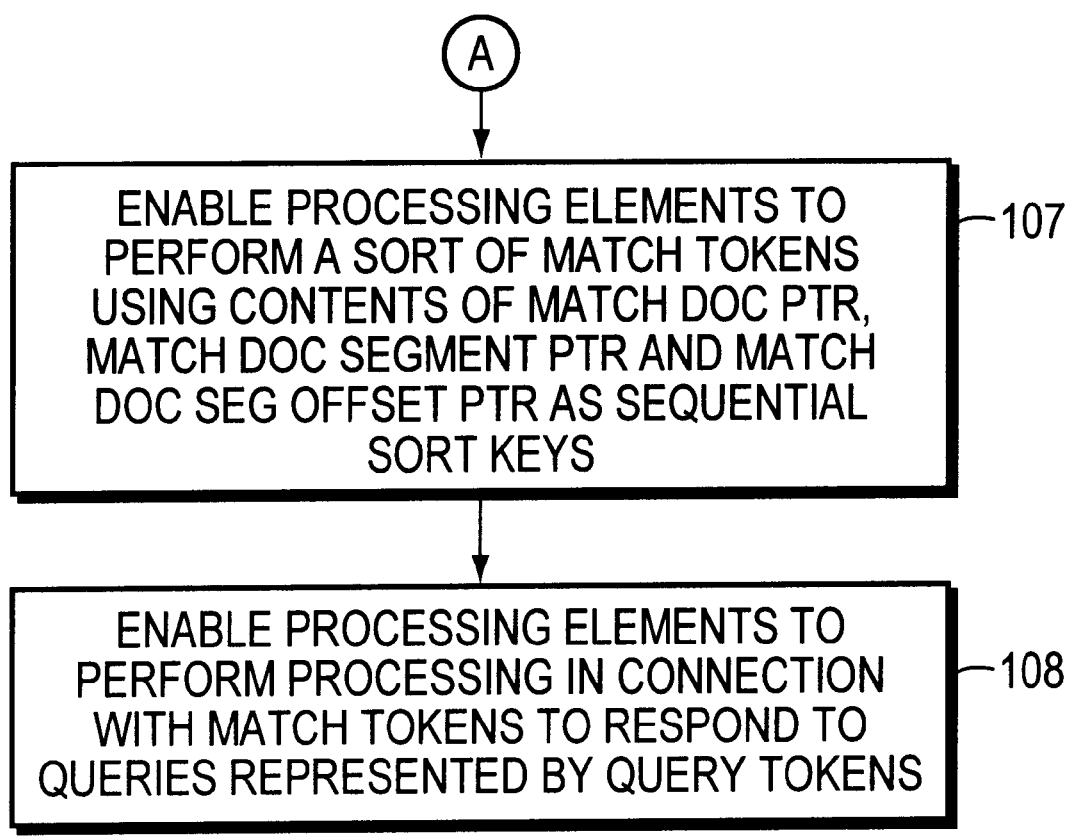

With this background, the operations performed by the text pattern matching system will be described in connection with FIGS. 3A and 3B. FIGS. 3A and 3B depict, in particular, the operations performed by the text pattern matching system in generating match tokens and in organizing them to aid in identifying particular documents which contain symbols which correspond to the particular criteria set forth in a query. FIGS. 4A through 5B depict operations performed by the system in searching the respective match tokens to determine if any of the queries are satisfied.

With reference to FIG. 3A, the text pattern matching system, in particular the micro-controller 11, will initially enable the processing elements 13(i) to load respective text tokens, with one text token being provided to each processing element 13(i) (step 100). The micro-controller 11 enables the text tokens to be assigned to processing elements 13(i) in document order, that is, in order of the values contained in their document pointer, document segment pointer and document segment offset pointer fields 32 through 34, so that the processing elements 13(i) with successive identifiers will have text tokens for successive symbols in the successive documents in the document base.

After enabling the processing elements 13(i) to load the text tokens, the micro-controller 11 enables them to load the query tokens. The micro-controller 11 enables the loading of query tokens by processing elements 13(i) immediately above the document tokens (step 101) That is, if the processing elements 13(0) through 13(D) contain document tokens, the micro-controller 11 enables the query tokens to be loaded into the processing elements beginning with processing element 13(D+1). In addition, the micro-controller 11 enables the text tokens to be loaded in query token order, that is, in order of the values contained in their document pointer, document segment pointer and document segment offset pointer fields 32 through 34. As noted above, for the query tokens, these fields contain values that identify the query, and the location in the query of the symbol associated with the query token.

It will be appreciated that, depending on the number of processing elements 13($i$) that are available in a particular massively-parallel computer, if the index "i" corresponds to the processing element identifier in the massively-parallel computer, it may be advantageous to load each text token and query token into processing element 13($i$) such that $$i=<\text{DOC\_PTR}|\text{DOC\_SEGMENT\_PTR}|\text{DOC\_SEG\_OFFSET\_PTR}> \qquad [\text{Eqn. 1}]$$

where "i" is the index in reference numeral 13($i$), and thus the processing element identifier; and "DOC_PTR" represents the value of document pointer field 32 of the associated text or query token, "DOC_SEGMENT_PTR" represents the value of document segment pointer field 33 of the associated text or query token, "DOC_SEG_OFFSET_PTR" represents the value of the document segment offset pointer field 34 of the associated text or query token, and "|" is the concatenation operator.

It will be appreciated that assigning text or query tokens to processing elements 13($i$) in this manner may result in some gaps in processing elements 13($i$) which receive tokens.

After enabling the processing elements 13($i$) to load the text tokens and the query tokens, the micro-controller 11 enables them to perform a sort operation in connection with the contents of the symbol identification field 31 of all of the text and query tokens (step 102). This will enable the processing elements 13($i$) to transmit tokens over the interconnection network 16 so that they will be ordered in the processing elements 13($i$) according to the contents of their symbol identification fields 31. This will further cause the text and query tokens to be intermixed, and if any text tokens have the same values in their symbol identification fields 31 as a query token, they will be in a series of processing elements 13($i_x$) through 13($i_y$). It will be appreciated that, if a query has multiple occurrences of the same symbol, or if the same symbol occurs in the multiple queries being processed together, the series of processing elements will include multiple query tokens, one for each occurrence of the symbol in the query or queries. There are a number of conventional sorting arrangements which may be used in performing the sort operation in step 102.

The micro-controller 11 then initiates a series of iterations (steps 103 through 106) to enable the processing elements 13($i_q$) which have query tokens to determine whether each successive proximate processing element 13($i_q \pm 1,2,3 \ldots$) contain text tokens representing the same symbol as that represented by the query token and if so to generate a match token. In particular, the micro-controller 11 initially enables the processing elements 13($i$) to determine whether a proximate processing element 13($i$) has either a text token or a query token whose symbol identification field 31 contains the same value as that of its query token (step 103). If any processing elements 13($i_{qp}$) have a positive determination in step 103 (step 104), the micro-controller 11 sequences to step 105, in which it enables the processing elements 13($i_{qp}$) with a positive determination in step 103 to determine whether the proximate processing element has a text token (step 105). The micro-controller 11 then enables those processing elements which make a positive determination in step 105 to generate a match token (step 106). It will be appreciated that, since, as described above, a series of processing elements 13($i_x$) through 13($i_y$) may include not only multiple text tokens, but also multiple query tokens, with the same value in their respective symbol identification fields 31, the micro-controller will enable those processing elements 13($i_{qp}$) which determine that, if its token has the same value in its symbol identification field 31 as that of the token in a proximate processing element, the token is a text token and not a query token.

In enabling the processing elements 13($i_{qp}$) to generate a match token, the micro-controller 11 enables the processing elements 13($i_{qp}$) to copy the respective symbol and symbol identification values from fields 30 and 31 of either the text token or the query token into corresponding fields 30 and 31 of the match token. In that operation, either the text token or the query token may be used, since they contain the same values. In addition, the micro-controller 11 enables the processing elements 13($i_{qp}$) which are generating match tokens to copy the contents of the query token's document/query text identification portion 21 and query information portion 22, except the query token flag 40, into the same portions 21 and 21 of the match token, and to further copy the contents of the document pointer field 32, document segment pointer field 33 and document segment offset pointer field 34 into fields 51 through 53 of the match information field 23, and to set the match token flag 50. The micro-controller 11 will also enable the processing elements 13($i_{qp}$) which are generating match tokens to add a constant displacement value to the contents of the document pointer field 32 of their respective match token, the displacement value being selected so that the minimum value in the document pointer fields 32 of the match tokens is greater than the maximum value in the document pointer fields 32 of the query tokens.

The micro-controller 11 enables the processing elements 13($i_q$) to iteratively perform steps 103 through 106, with each iteration the processing elements 13($i_q$) with query tokens making the determination in step 103 with respect to a different proximate processing element 13($i_d$) with a different text token. Accordingly, for each iterations during which a processing element 13($i_{qp}$) makes a positive determination in step 103, the positive determination will be with respect to a different processing element 13($i_d$), and thus with respect to a different text token, and the match token will relate to a different text token. If in a particular iteration a processing element 13($i_q$) which has a query token determines that the proximate processing element 13($i_q \pm 1, 2, 3 \ldots$) does not have a token whose symbol identification field 31 has the same value as that of its query token (step 103) or if it determines that the proximate processing element has such a token but that it is not a text token, it will not generate a match token. It will be appreciated that at some iteration, the micro-controller 11 will determine in step 104 that none of the processing elements 13($i_q$) have determined in step 103, that their proximate processing elements 13($i_q \pm 1, 2, 3 \ldots$) have tokens in which the values of the symbol identification fields 31 correspond to those of their query tokens. Since the sort operation in step 102 provided that all query and text tokens would be in one series of proximate processing elements 13($i_x$) through 13($i_y$), if all of the processing elements 13($i_q$) determine in step 103 that the symbol identification fields 31 of their respective query tokens contain values that differ from those of the text tokens of the particular proximate processing element during the iteration, the micro-controller will have enabled generation of match tokens for all text tokens for which query tokens have corresponding values in their respective symbol identification fields 31, at which point the micro-controller 11 sequences to step 107 (FIG. 3B)

In step 107, the micro-controller enables the processing elements 13(*i*) to perform a sort, also over the interconnection network 16, of the match tokens which were generated in step 106, the search being performed according to the contents of the document pointer field 32, document segment pointer field 33 and document segment offset field 34. It will be appreciated that, since the match tokens were generated with values in their document pointer fields 32 which are different from, and above, the values in corresponding fields of the text and query tokens, the micro-controller 11 can enable the processing elements 13(*i*) to perform a sort operation over the interconnection network 16 in connection with all of the text, query, and match tokens. It will further be appreciated that, since the contents of the document pointer fields 32 of the query tokens are above those of the text tokens, the sort will place the text tokens in a first series of processing elements 13(*a*) through 13(*b*), the query tokens in a second series of processing elements 13(*c*) through 13(*d*), where "c" is greater than "b," and the match tokens in a third series of processing elements 13(*e*) through 13(*f*), where "e" is greater then "d." Further, since the sort was in connection with the contents of document pointer field 32, document segment pointer field 33 and document segment offset pointer field 34, and since in match tokens the contents of these fields correspond to the values of the query tokens from which the match tokens were generated, the sorted match tokens are in order of the respective queries, and within each query in order of the symbol within the query.

Thereafter, the micro-controller 11 enables the processing elements to perform processing in connection with the match tokens to respond to queries represented by the query tokens (step 108). In that operation, the micro-controller 11 can perform a further sort operation over the interconnection network 16 on the match tokens in processing elements 13(*e*) through 13(*f*) to further order them, within each query, according to the contents of their match document pointer, match segment pointer and match segment offset pointer fields 51 through 53. Since these fields identify the document and location within the document at which the symbol represented by the match token occurs, this will order the match tokens for each query in the order in which the symbols occur in a document. This will simplify further processing if multiple documents match a particular query, as the sort performed in connection with step 107 may intermix tokens relating to the same symbol from multiple documents, as well as multiple occurrences of a symbol within a single document.

Figure 4A:
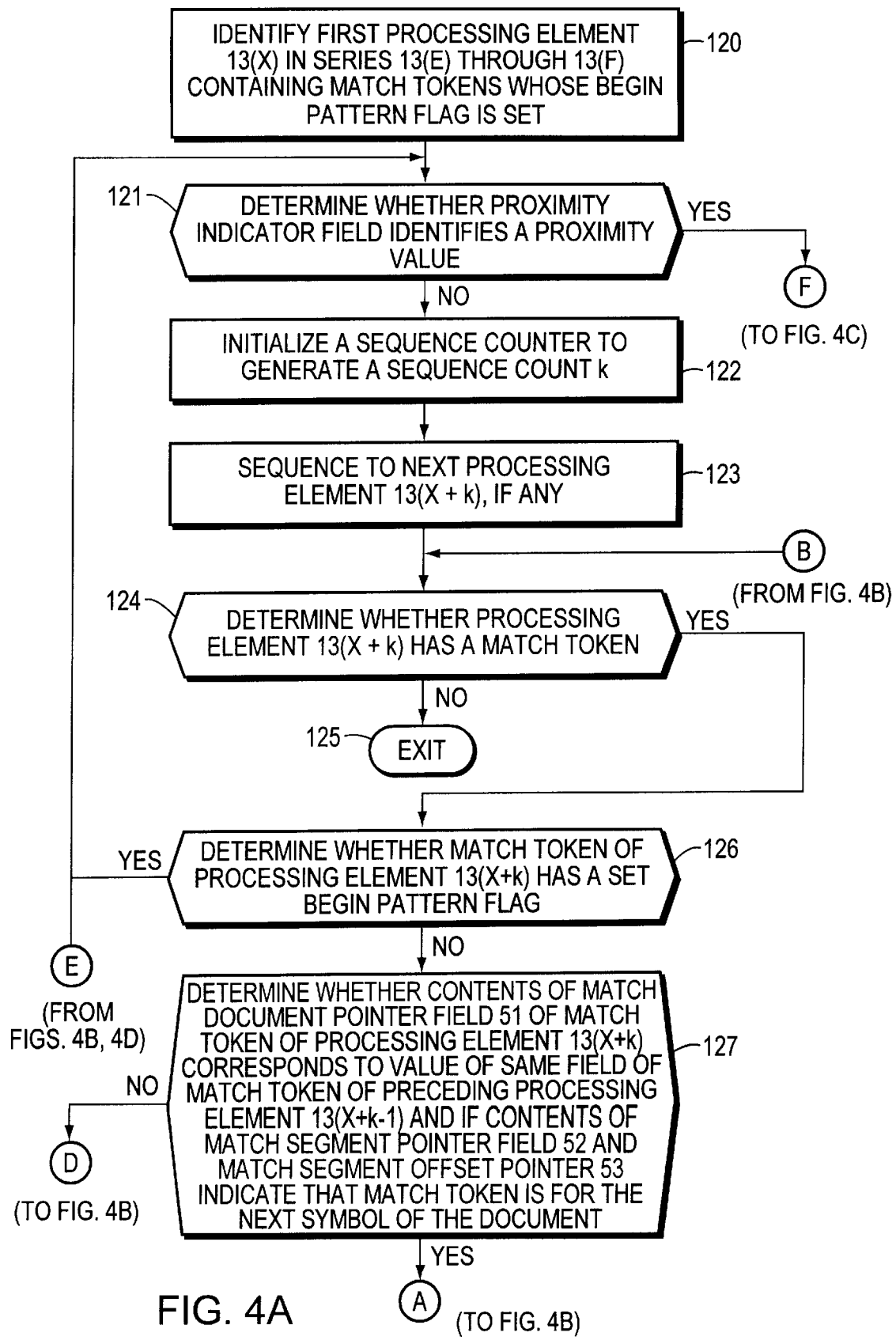
FIGS. 4A through 4D together contain a flow diagram that illustrates the operations performed by a single processor in processing the match tokens generated in accordance with FIGS. 3A and 3B to identify matches between a query pattern and document text in the document textbase.
Figure 4B:
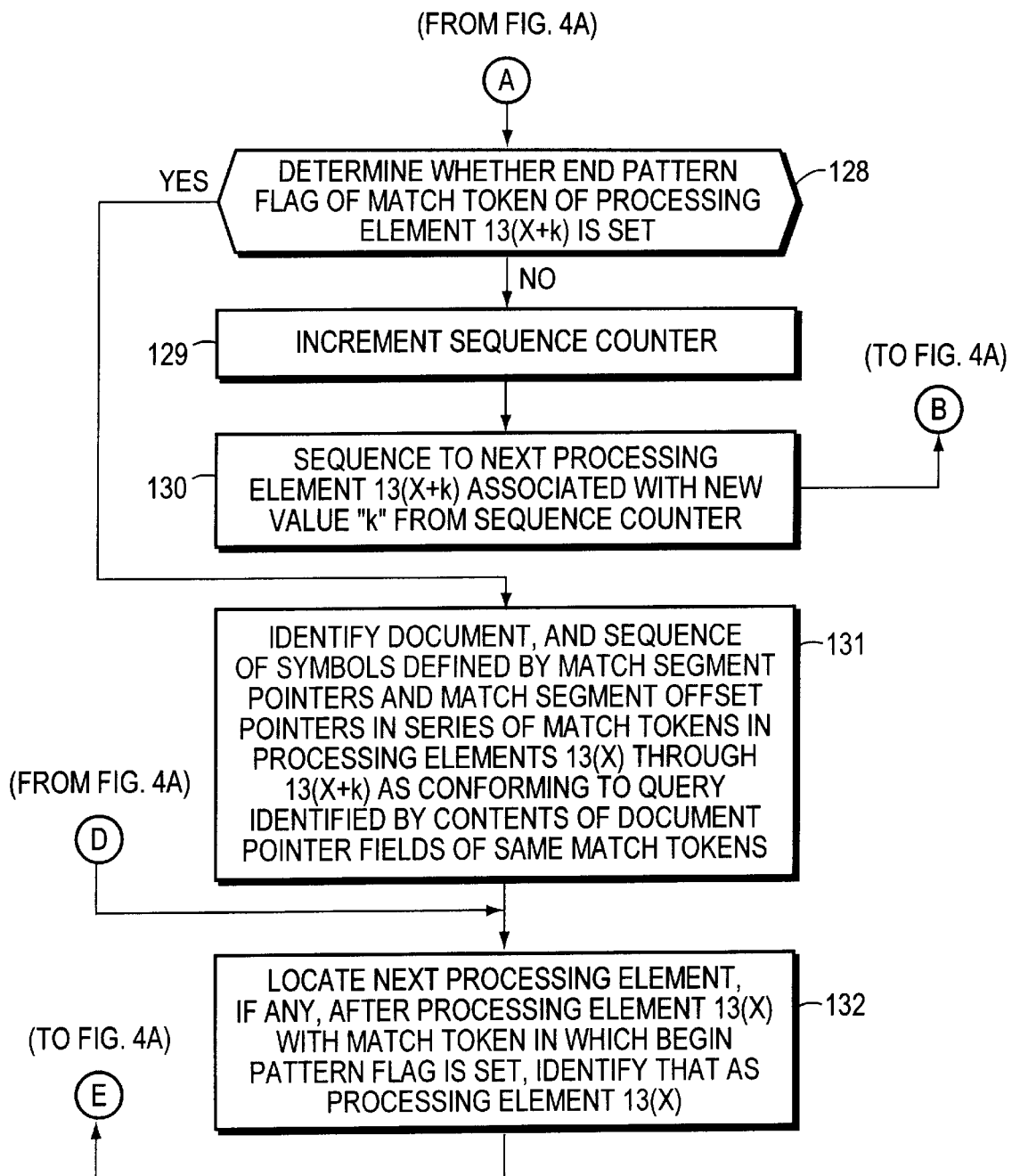
Figure 4C:
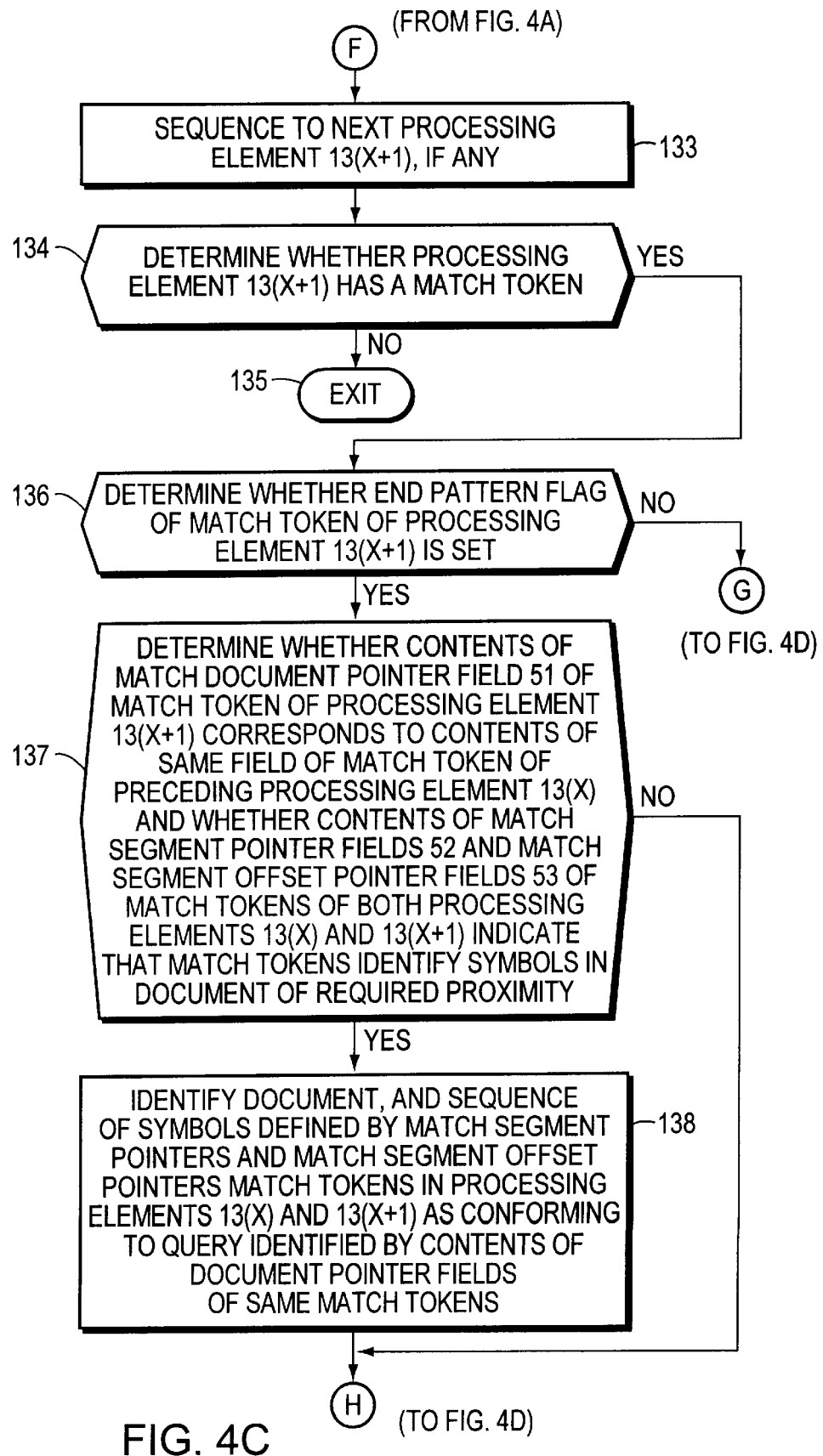
Figure 4D:
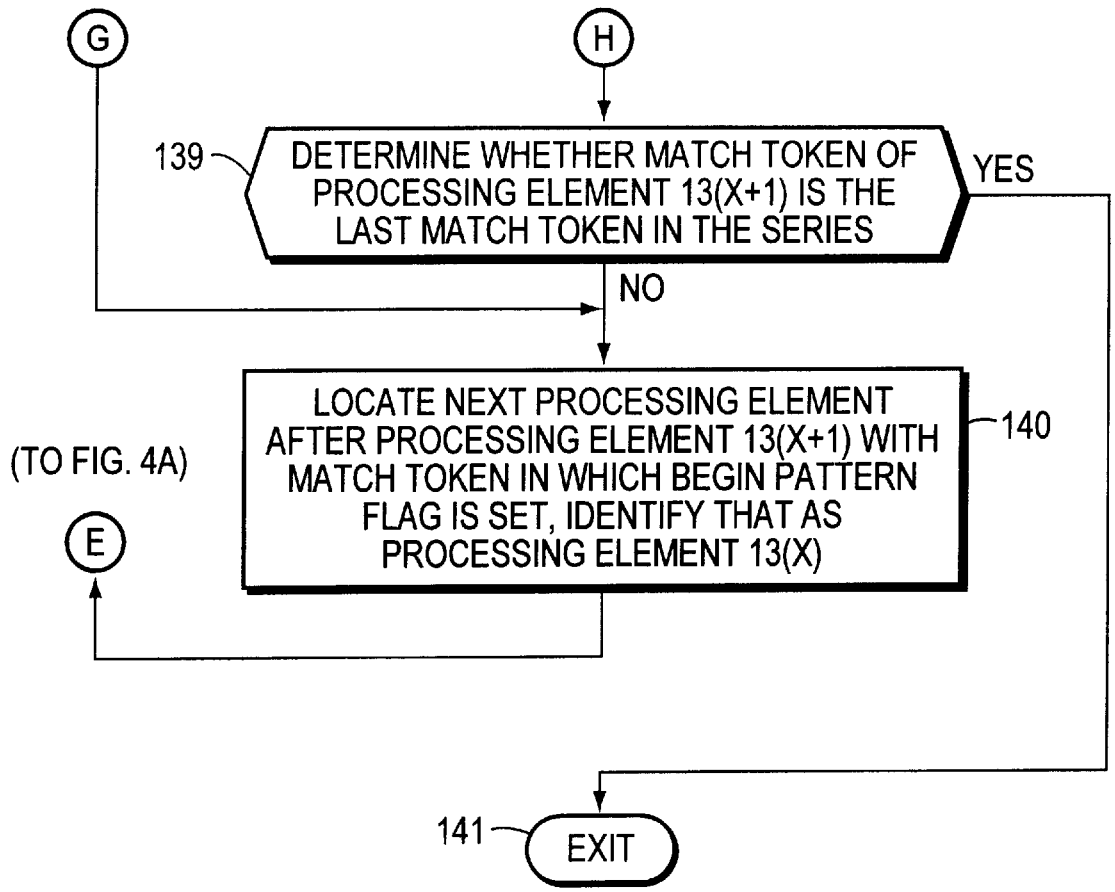

Thereafter, the micro-controller 11 can process the series of match tokens in the series of processing elements 13(*e*) through 13(*f*) to determine if the respective query criteria have been satisfied. Two modes of operation of the text pattern matching system will be described. FIGS. 4A through 4D depict a flow chart in which the micro-controller 11 enables the processing elements to process match tokens in series, while FIGS. 5A and 5B depict a flow chart in which the micro-controller 11 enables the processing elements to process the match tokens in parallel. With reference to FIG. 4A, the micro-controller 11 first identifies the first processing element 13(*x*) in the series of processing elements 13(*e*) through 13(*f*), that is, the series of processing elements containing the match tokens, whose begin pattern flag 41 is set (step 120). This enables the micro-controller 11 to identify the processing element 13(*x*) whose match token may be the first in a series associated with a query. The micro-controller 11 uses the contents of the proximity indicator field 45 to determine whether the match token relates to a query to find documents which contain a symbol string or a query to find documents which contain a symbol within a selected proximity to another symbol (step 121). If the query is of the latter type, it will step to a sequence described below in connection with FIG. 4C. On the other hand, if the query is to find documents which contain a symbol string, it will step to a sequence comprising steps 122 through 132 to determine if match tokens in successive processing elements 13(*x*+1,2,3 . . . ) to the first match token whose end pattern flag 42 is set, identifies, in their match segment pointer fields 52 and match segment offset pointer fields 53, sequential symbol offsets in the document identified in the match document pointer fields 51.

In that operation, the micro-controller 11 initializes a sequence counter (not shown) which it will use to generate a sequence count (step 122). The sequence counter will be used to help identify each successive processing element 13(*x*+k) (k=1, 2, 3, . . . ) in the series of processing elements 13(*x*) after processing element 13(*x*) whose match tokens correspond to the same query as that of processing element 13(*x*). The micro-controller 11 then determines whether there is a processing element 13(*x*+k), where "k" is the value provided by he sequence counter, which at this point will be the next processing element 13(*x*+1), and if so sequences to it (step 123). The micro-controller 11 then determines whether the processing element 13(*x*+1) has a match token. If not, all of the match tokens for all of the queries have been processed and so the micro-controller exits (step 125). At this point, it will be assumed that a plurality of match tokens were generated during the operations as described in connection with FIGS. 3A and 3B, and so the micro-controller will determine in step 124 that the processing element 13(*x*+1) has a match token.

The micro-controller 11 then determines whether the match token of processing element 13(*x*+1) has a set begin pattern flag 41 (step 126). If that match token has a set begin pattern flag 41, the match token is for a different query pattern than that of the match token of processing element 13(*x*). As a result, the micro-controller returns to step 121 and uses that processing element as the first processing element 13(*x*) in the succeeding operations.

If the micro-controller 11 determines in step 126 that the match token of processing element 13(*x*+1) does not have a set begin pattern flag 41, it determines whether fields 51 through 53 indicate that the match token is for the next symbol, after that represented by the match token of processing element 13(*x*), of the same document (step 127). If so, the micro-controller determines whether the end pattern flag 42 of the match token of the processing element 13(*x*+1) is set (step 128). If the end pattern flag 42 of the match token is not set, the match token of processing element 13(*x*+1) is not the last in the series of match tokens relating to the query identified in their document pointer fields 32, and so the micro-controller increments the sequence counter (step 129) and steps to the next processing element 13(*x*+2) (step 130) and returns to step 124 to repeat the operations of steps 124 through 130.

The micro-controller 11 repeats the operations described above in connection with steps 124 through 130. At some point, it may determine in step 126 that the processing element 13(*x*+k) has a match token whose begin pattern flag 41 is set. If that match token has a set begin pattern flag 41, the match token is for a new query pattern, and so the micro-controller returns to step 121 and uses that processing element 13(*x*+k) as the first processing element 13(*x*) in the succeeding operations.

Further, at some point during the iterations described in connection with steps 124 through 130, the micro-controller 11 may make a negative determination in step 125 for processing element 13(*x*+K), indicating that the contents of the match document pointer, match segment pointer and match segment offset pointer fields 51 through 53 of the processing element's match token indicate that the symbol of the document associated with the match token is not the next symbol of the document associated with the match token of the preceding processing element 13(*x*+K−1). Accordingly, the sequence of match tokens in the series of processing elements beginning with processing element 13(*x*) does not identify a document, segment and offset which corresponds to the query. In that case, the micro-controller 11 determines that the series of processing elements beginning with processing element 13(*x*) does not satisfy the query. Thereafter, the micro-controller determines whether there is a subsequent processing element which has a match token whose begin pattern flag 41 is set (step 132) If so, it identifies that as the first processing element 13(*x*) in a possible series which can identify a document, segment and segment offset, as identified in fields 51 through 53, which can satisfy the query identified in document pointer field 32 of that match token, and returns to step 121 to determine whether the query is satisfied.

At some point, however, the micro-controller may determine in step 128 that the match token of the processing element 13(*x*+k) has a set end pattern flag 42. The set end pattern flag 42 of the match token of the processing element 13(*x*+k) indicates that the match token is the last for the series associated with the query identified in the document pointer field 32, and since positive determinations will have been made in step 127 for each processing element in the sequence from processing element 13(*x*), in which the match token's begin pattern flag 41 was set, to processing element 13(*x*+k), in which the match token's end pattern flag 42 is set, the match tokens represent a series of symbols in the document identified by the match document pointer flag 41, at the segments and series of offsets within the document identified by the match segment and match segment offset pointer fields 52 and 53 in the series of match tokens, for the query identified in the document pointer field 32. Accordingly, the micro-controller saves this information (step 131) indicating a match for the query. Thereafter, the micro-controller determines whether there is a subsequent processing element which has a match token whose begin pattern flag 41 is set (step 132) If so, it identifies that as the first processing element 13(*x*) in a possible series which can identify a document, segment and segment offset, as identified in fields 51 through 53, which can satisfy the query identified in document pointer field 32 of that match token, and returns to step 121 to determine whether the query is satisfied.

Returning to step 121, at some point the micro-controller 11 may determine that, for a match token of processing element 13(*x*) whose begin pattern flag 41 is set, the proximity indicator field 45 indicates that the query is a proximity query, that is, that the query would be satisfied if the next processing element 13(*x*+1) has a match token for the same query and the match document pointer, match segment pointer and match segment offset pointer fields 51 through 53 point to a symbol in the same document within the indicated proximity of the symbol pointed to by fields 51 through 53 of the match token of processing element 13(*x*).

If the micro-controller 11 determines that the proximity indicator field 45 of the match token of processing element 13(*x*) indicates that the query is a proximity query, it sequences to step 133, in which it sequences to the next processing element 13(*x*+1), if one exists. If so, the micro-controller 11 determines whether processing element 13(*x*+1) has a match token (step 134).

At this point, it will be assumed that the processing element 13(*x*+1) has a match token, in which case the micro-controller 11 then determines whether the match token's end pattern flag 42 is set (step 136). In this case, since it is assumed that a proximity query involves two symbols, it will be appreciated that match tokens for the symbols should be in successive processing elements 13(*x*) and 13(*x*+1), in which case the micro-controller 11 determines, from the match document pointer, match segment pointer and match segment offset pointer fields 51 through 53 of the match token of processing element 13(*x*+1), whether the match token represents a symbol within the required proximity of the symbol represented by the token of processing element 13(*x*) (step 137). If the micro-controller 11 reaches a positive determination in step 137, it saves the saves this information (step 138) indicating a match for the query.

The micro-controller 11, following step 138, or 137 if it makes a negative determination, determines whether the match token of processing element 13(*x*+1) is the last in the series of processing elements having a match token (step 139). If not, it locates the next processing element after processing element 13(*x*+1) with a match token whose begin pattern flag 41 is set, if one exists, and returns to step 121 (FIG. 4A) to repeat the operations described above.

It will be appreciated that at some point in processing in connection with steps 124, 134 or 139, the micro-controller will determine that there are no additional match tokens. When that occurs, it has processed all of the match tokens, and will exit (steps 125, 135 and 141). The micro-controller 11 can then return the information saved in steps 131 and 138 through the host 10 to an operator or to a program that initiated the operation of the text pattern matching system.

Figure 5:
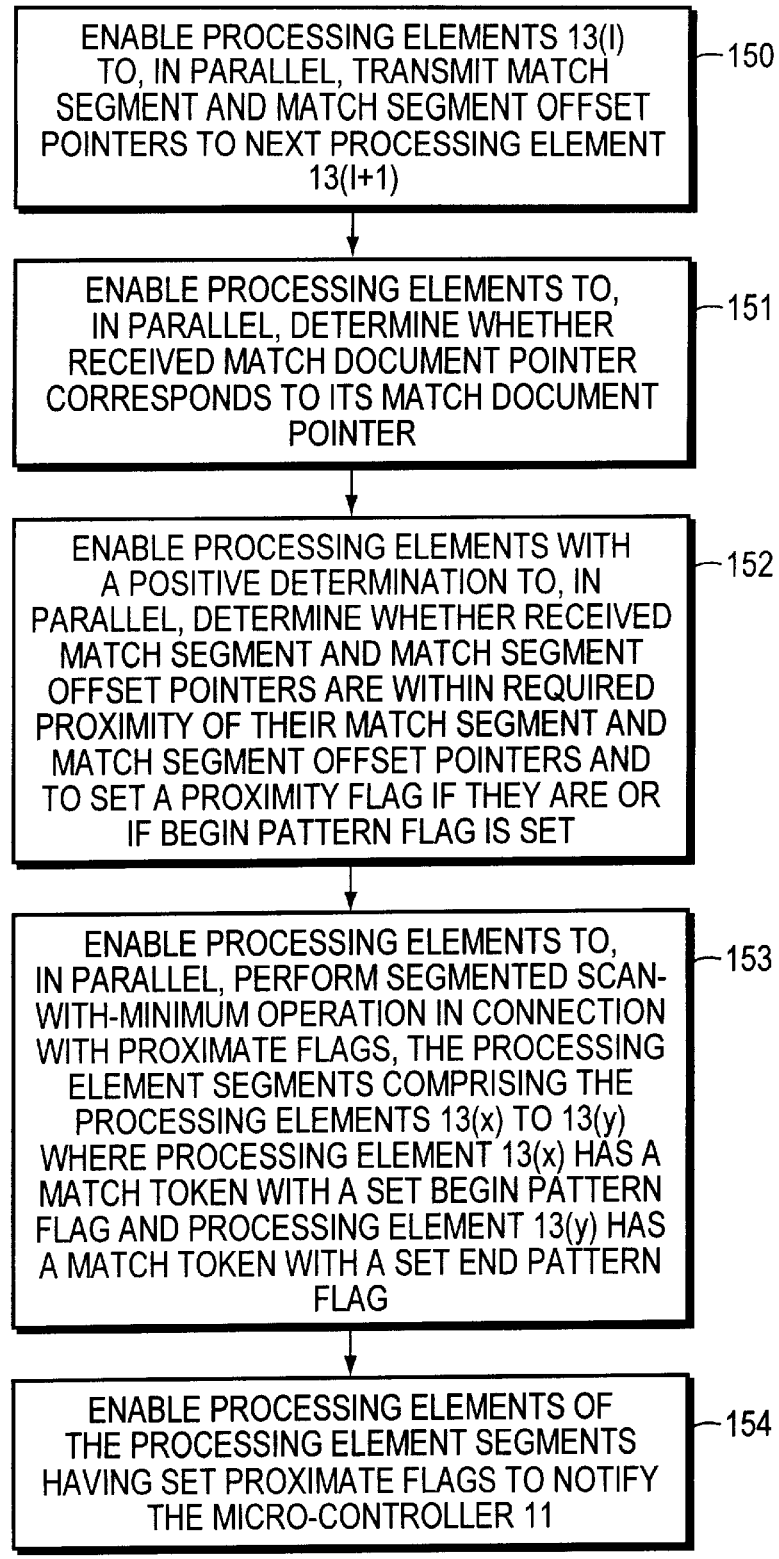
FIG. 5 contains a flow diagram that illustrates the operations performed by the massively-parallel computer depicted in FIG. 1 in processing the match tokens generated in accordance with FIGS. 3A and 3B to identify matches between a query pattern and document text in the document textbase.

It will be appreciated by those skilled in the art that the micro-controller 11 can enable the processing elements 13(*e*) through 13(*f*) of the massively parallel computer, that is, those processing element 13(*i*) which have match tokens, to perform operations described above in connection with FIGS. 4A through 4D in parallel by appropriate use of scan and segmented scan (also termed "parallel-prefix") operations. FIG. 5 depicts a flow chart of operations which may be enabled by the micro-controller 11 in this connection. With reference to FIG. 5, the micro-controller 11 initially enables the processing elements 13(*i*) to transmit, over the interconnection network 16, the match pointer, match segment pointer and match segment offset pointer information, representing the contents of the respective fields 51 through 53, to the next processing element 13(*i*+1) (step 150). It will be appreciated that, for processing elements 13(*i*) which have text tokens or query tokens, or which have no tokens, these fields will be empty, and so the values transmitted will be zero. For the processing elements 13(*x*) through 13(*y*) which have match tokens, the values transmitted will correspond to the location in the respective document at which the matches occurred for which the match tokens were generated. The micro-controller 11 then enables the processing elements 13(*i*) to, in parallel, determine whether the received match document pointer corresponds to its match document pointer, which will enable the processing elements 13(*i*) verify that the match tokens maintained by it and its neighbor processing element 13($i$−1) are for the same document (step 151).

Thereafter, the micro-controller 11 enables the processing elements 13($i$) with a positive determination in step 151 to determine whether the match segment pointer and match segment offset pointer information and the contents of their fields 52 and 53 are within the required proximity as indicated in proximity indicator field 45 (step 152). That is, if the proximity indicator field 45 indicates that the query operation relates to matching of a symbol string, each processing element 13($i$+1) will determine whether the contents of fields 52 and 53 indicate that the symbol in the document which is associated with its match token is next after the document symbol associated with the match token in processing element 13($i$), using the match segment pointer and match segment offset pointer information which it receives from processing element 13($i$). The micro-controller 11 further enables the processing elements 13($i$) to set a respective "proximity flag" (not shown in FIG. 1) if it makes a positive determination in step 152 or if its begin pattern flag 41 is set.

The micro-controller 11 then enables the enable processing elements 13($i$) to, in parallel, perform a segmented scan-with-minimum operation in connection with proximate flags. In that operation, the processing elements 13($i$) are divided into segments comprising the processing elements 13($x$) to 13($y$) where processing element 13($x$) has a match token with a set begin pattern flag and processing element 13($y$) is the next match token with a set end pattern flag. If a processing element 13($i$) has a match token in which both the begin and end pattern flags 41 and 42 are set, it forms a segment by itself. Effectively, if any of the processing elements 13($x$) to 13($y$) in a segment have a clear proximity flag, the scan-with-minimum operation will cause the proximity flags of all of the processing elements 13($x$) to 13($y$) in the segment to be clear. If, however, the proximity flags of all of the processing elements 13($x$) to 13($y$) in the segment are set prior to the scan-with-minimum operation, all of them will remain set. [Scan operations are described in G. Blelloch, *Vector Models For Data Parallel Computing*, (MIT Press, 1990).]

Following step 153, the micro-controller 11 will use the conditions of the proximity flags in the respective segments of processing elements 13($i$) to determine which queries have been satisfied by which documents (step 154). If the processing elements 13($x$) through 13($y$) of a segment have set proximity flags, the query identified in their match tokens are satisfied by the document identified in the match token, and further in the location, that is, the segment and offset, identified in the match tokens.

As noted above, in one particular embodiment, the host 10 itself will generate query tokens in response to queries which are provided thereto in a particular query language. A description illustrating the correspondence between particular forms of queries and particular match tokens or sequences of match tokens that may be generated in response thereto will now be presented.

As a first example, if the query is for a sequence of symbols $\{S_1\ S_2\ \ldots\ S_N\}$ in a predetermined order "1" through "N" as set forth in the query, the host 10 will generate a series of 'N" query tokens in which the symbol and symbol identification fields 30 and 31 contain the symbol representation and the symbol identification value. The document pointer fields 32 for all of the query tokens will all contain a query identifier. The document segment pointer and document segment offset pointer fields 33 and 34 for the query token generated for each symbols $S_i$ ("i" is an index from "1" to "N") will contain a value corresponding to the value of the index "i." The query pattern element flags 40 of the query tokens will be set to indicate that they are query tokens. In addition, the begin pattern flag 41 of the query token generated for the symbol $S_1$ will be set, and the end pattern flag 41 of the query token generated for the symbol $S_N$ will also be set. Otherwise, the begin pattern flags 41 and end pattern flags 42 will be clear. The begin and end label flags 43 and 44 will be clear, and the fields of the match information portion 23 will also be empty. The proximity indicator 45 will contain the value "+1" to indicate that the query tokens must be adjacent to, and one greater than, the query token for the preceding symbol in the query. As a result, if each processing elements 13($i$) determines that the values of the match document pointer, match segment pointer and match offset pointer fields 51 through 53 provided by the preceding processing element 13($i$−1) has the required proximity, the symbol string of the query will be in the same sequence as the symbol string of the document.

On the other hand, if the query is for a set of symbols $\{S_1\ S_2\ \ldots\ S_N\}$ accompanied by a Boolean operator, the particular query tokens that are generated will depend in part upon the Boolean operator. If the Boolean operator is OR, such that the query will be matched for a document if any of the symbols $S_a$ through $S_N$ are present in the document, the various fields of the query tokens will be substantially as described above, except that the begin and end pattern flags 41 and 42 of all of the query tokens will be set. This will essentially provide that the query will be matched if any of the symbols are present in a document, regardless of their order and proximity. However, if the Boolean operator is AND, such that the query will be matched for a document if all of the symbols $S_1$ through $S_N$ are present in the document, regardless of the order, the query tokens will also be substantially as described above, except that the begin and end pattern flags 41 and 42 will be set only for the query tokens for symbols $S_1$ and $S_N$, respectively, and the proximity indicator fields 45 will receive a code value, essentially infinity, indicating only that the symbol need occur anywhere within the document.

It will be appreciated that a query accompanied by a Boolean operator involving symbols $\{S_1\ \ldots\ S_N\}$ may specify, as part of the query, a symbol string $[S_X\ \ldots\ S_Y]$ ($1 < X < Y < N$). In that case, if, for example, the Boolean operator is an OR, the query will be matched for documents which contain any of the symbols $S_1$ through $S_{X-1}$ or $S_{Y+1}$ through $S_N$ anywhere, as well as for documents which contain the symbol string $[S_X\ \ldots\ S_Y]$ in that order. For such a query, the query tokens for the symbols $S_1$ through $S_{X-1}$ or $S_{Y+1}$ through $S_N$ will be as described above for the query with Boolean operator OR, that is, the begin and end pattern flags 41 and 42 for all of the query tokens will be set. On the other hand, the query tokens for the symbols for the symbol string $[S_X\ \ldots\ S_Y]$ will be as described above for a query for a symbol string, that is the begin pattern flag 41 of the query token for symbol $S_X$ will be set and the end pattern flag 42 of the query token for symbol $S_Y$ will be set. Conditioning the begin and end pattern flags 41 and 42 in this manner will provide that a match will be found for documents which contain any of the symbols $S_1$ through $S_{X-1}$ or $S_{Y+1}$ through $S_N$, or which contain the symbol string $[S_X\ \ldots\ S_Y]$. Similarly, if the Boolean operator is AND, the proximity values in the proximity indicator fields 45 for the query tokens for the symbols $S_X$ through $S_Y$ in the symbol string will have the value "one" instead of the code value described above.

More complex forms of query may result in more complex series of query tokens. If a query requests the identification of documents which have two symbols $S_1$ and $S_2$ appearing within a selected proximity, or number of symbols, "P" of each other, two query tokens will be generated with the fields containing substantially the same values as first described above, with the begin pattern flag 41 for the query token for symbol $S_1$ being set and the end pattern flag 42 for the query token for symbol $S_2$ being set. The proximity indicator field 45 of the query token for symbol $S_2$ will receive the value "P." The proximity value may have a positive or negative sign to require the symbols to appear in a particular order in a document for a match to occur, or it may be unsigned in which case the symbols may appear in any order for a match to occur.

Similarly, if a query requests the identification of documents which have a symbol $S_0$ within a selected proximity of a set of symbols $\{S_1 \ldots S_N\}$ accompanied by a Boolean operator, such as "OR," "N" sets of query tokens will be generated each including a query token for symbol $S_0$ and a query token for one of the "N" symbols $S_i$ (index "i" having a value from 1 through N). For each set of query tokens so generated, the query token for symbol $S_0$ will have a set begin pattern flag 41 set and the query token for symbol $S_i$ will have a set end pattern flag 42 and the proximity value "P" in the proximity indicator field 45.

As described above in connection with FIG. 2, the tokens also has begin and end label fields 43 and 44. These fields may be used to enable the text pattern matching system to annotate the document base by providing a label, comprising a sequence of one or more symbols $L_i$ ("i" is an index) each having a text token. The additional text tokens can be thereafter used in connection with processing of a query as any other text token. In such an operation, the operator may provide an initial query which is processed as described above, which initial query identifies the symbols and the other criteria to be satisfied in determining whether the document base is to be annotated with a label. For each series of text symbols in the document base which satisfies the labeling criteria, a series of one or more text tokens is added, each identifying a symbol $L_i$, with the first and last tokens in the sequence containing the label symbols having respective begin and end label flags 43 and 44 set. Thereafter, the annotated document base can be used in connection with queries involving the sequences of label symbols $L_i$ in the same way as other query or text symbols. It will be appreciated that this facility will permits the operator to annotate the document base with additional information which can be used in connection with queries in an efficient manner.

The text pattern matching system according to the invention has a number of advantages. Because it uses parallel processing techniques, it can process queries much more rapidly than serial computer systems. In addition, it does not require extensive preprocessing of the entire document base to establish inverted files, as required in some serial pattern matching techniques. Furthermore, since the text pattern matching system uses tokens representing symbols used in queries, it can process any number of queries all in parallel, significantly enhancing the query processing rate over that available in conventional techniques using serial computers The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A text pattern matching system for identifying ones of a plurality of documents in a document text base which satisfy a query, each of said documents comprising a series of ordered text symbols, with each text symbol being represented by a text token, each query comprising a series of query symbols, with each query symbol being represented by a query token, said text pattern matching system comprising:

A. a match token generator for generating a match token for each text token whose text symbol corresponds to a query token's query symbol, the match token generator associating each match token with (i) document identifier information identifying one of said documents containing the text symbol corresponding to the query symbol, (ii) text symbol sequence information identifying the position of the text symbol in the series of text symbols which comprise the document, and (iii) query symbol sequence information identifying the position of the query symbol in the series of query symbols which comprise the query;

B. a match token sorter for sorting match tokens generated by said match token generator according to the document identifier information and the text symbol sequence information associated therewith; and C. a query processor for identifying, using the query symbol sequence information associated with the match tokens as sorted by the match token sorter, sequences of match tokens relating to a query which satisfy the query, the document identifier information of match tokens in the identified sequences of match tokens identifying the documents that satisfy the query.

2. A text pattern matching system as defined in claim 1 in which each text token and each query token further includes a symbol identifier, the symbol identifier in each text token having a value that identifies the text symbol associated therewith and the symbol identifier in each query token having a value that identifies the query symbol associated therewith, the match token generator identifying, for each query token, text tokens having symbol identifiers which correspond to the query token's symbol identifier, and generating a match token for each text token so identified.

3. A text pattern matching system as defined in claim 2 in which the match token generator includes:

A. a token sorter for sorting the text tokens and the query tokens in sorted order according to the values of their respective text symbols and query symbols, to thereby position in the sorted order each query token proximate the text tokens whose text symbols correspond to the query token's query symbol;

B. a proximate token identifier for, for each query token, identifying the text tokens whose text symbol corresponds to the value of the query token's query symbol, in that operation the proximate token identifier, for each query token, comparing the query token's query symbol to proximate text tokens in the sorted order as generated by the token sorter and identifying those text tokens whose text symbols correspond to the query token's query symbol; and B. a match token generator for generating a match token for each text token identified by said proximate token identifier.

4. A text pattern matching system as defined in claim 1 in which said query processor includes:

A. a match token query begin sequence identifier for identifying one of said match tokens whose query symbol sequence information identifies the match token as having a query symbol corresponding to an initial query symbol in the query;

B. a match token query end sequence identifier for identifying one of said match tokens whose query symbol sequence information identifies the match token as having a query symbol corresponding to a final query symbol in the query;

C. a match token sequence processor for determining whether the document identifier information and the text symbol sequence information of proximate match tokens in the sorted order established by the match token sorter satisfies a selected query criterion; and D. a query processor controller for enabling said match token query begin sequence identifier, said match token query end sequence identifier and said match token sequence processor to operate in connection with successive match tokens in the sorted order established by said match token sorter, the query processor controller:

i. enabling said match token query begin sequence identifier to operate to identify a match token whose query symbol sequence information identifies the match token as having a query symbol corresponding to an initial query symbol in the query;

ii. enabling said match token sequence processor, beginning with the match token identified by said match token query begin sequence identifier, in a series of iterations, to determine whether the document identifier information and the text symbol sequence information of each successive match tokens, in the order established by the match token sorter, satisfies the selected query criterion with the document identifier information and the text symbol sequence information of a previous match token, the query processor controller enabling the match token sequence detector to iteratively operate in response to a positive determination in each iteration, and otherwise enabling said match token query begin identifier to operate;

iii. enabling said match token query end identifier to, in response to each positive determination by said match token sequence detector, determine whether the match token for which the match token sequence detector generated the positive determination includes query symbol sequence information that identifies the match token as having a query symbol corresponding to an end query symbol in the query, the query processor controller, in response to a positive determination by said match token query end identifier, identifying the series of match tokens from the match token for which the match token query end identifier generated the positive determination and the match token identified by the match token query begin identifier as satisfying the query.

5. A text pattern matching system as defined in claim 4 in which each match token includes a proximity value, the proximity value defining a selected proximity relationship with respect to the text symbol sequence information of the previous match token in the sorted order established by the match token sorter, the match token sequence processor using the proximity value in determining whether the document identifier information and the text symbol sequence information of proximate match tokens in the sorted order established by the match token sorter satisfies the selected query criterion.

6. A text pattern matching system for identifying ones of a plurality of documents in a document text base which satisfy a query, each of said documents comprising a series of ordered text symbols, with each text symbol being represented by a text token, each query comprising a series of query symbols, with each query symbol being represented by a query token, said text pattern matching system comprising:

A. a memory including a series of addressable storage locations, each storage location storing data including one of said text tokens or one of said query tokens;

B. a processor for performing processing operations in connection with data stored in said memory; and C. a controller for controlling the operations of said processor, the controller including:

i. a match token generator control module for enabling said processor to generate a match token for each text token whose text symbol corresponds to a query token's query symbol, the processor associating each match token with (i) document identifier information identifying one of said documents containing the text symbol corresponding to the query symbol, (ii) text symbol sequence information identifying the position of the text symbol in the series of text symbols which comprise the document, and (iii) query symbol sequence information identifying the position of the query symbol in the series of query symbols which comprise the query, the processor storing each match token so generated in the memory;

ii. a match token processing control module for enabling said processor to sort in successive storage locations in the memory the match tokens generated during processing in response to said match token generating module according to the document identifier information and the text symbol sequence information associated therewith; and iii. a query processing control module for enabling said processor to use the match tokens as sorted during processing in response to said match token processing control module, the processor using the query symbol sequence information associated with the match tokens to identify sequences of match tokens relating to a query which satisfy the query, the processor using the document identifier information of match tokens in the identified sequences of match tokens to identify the documents that satisfy the query.

7. A text pattern matching system as defined in claim 6 in which each text token and each query token further includes a symbol identifier, the symbol identifier in each text token having a value that identifies the text symbol associated therewith and the symbol identifier in each query token having a value that identifies the query symbol associated therewith, the match token generator control module enabling the processor to identify, for each query token in said memory, ones of said text tokens in said memory having symbol identifiers which correspond to the query token's symbol identifier, and to generate a match token for each text token so identified.

8. A text pattern matching system as defined in claim 7 in which the match token generator control module includes:

A. a token sorter control module for enabling said processor to perform a sort operation to place the text tokens and the query tokens storage locations in said memory in sorted order according to the values of their respective text symbols and query symbols, so that each query token will be located in a storage location proximate storage locations containing said text tokens whose text symbols correspond to the query token's query symbol;

B. a proximate token identifier control module for enabling the processor to, for each query token, identify the text tokens whose text symbol corresponds to the value of the query token's query symbol, in that operation the processor, for each query token, comparing the query token's query symbol to proximate text tokens in the sorted order as generated during processing in response to the token sorter control module and identifying those text tokens whose text symbols correspond to the query token's query symbol; and B. a token generator control module for enabling the processor to generate a match token for each text token identified during processing in response to said proximate token identifier control module.

9. A text pattern matching system as defined in claim 6 in which said query processor control module includes:

A. a match token query begin sequence identification control element for enabling said processor to identify one of said match tokens whose query symbol sequence information identifies the match token as having a query symbol corresponding to an initial query symbol in the query;

B. a match token sequence processing control module for enabling the processor to determine, for match tokens in successive storage locations following the match token identified in response to processing in accordance with the match token query begin sequence identification control element, whether the document identifier information and the text symbol sequence information of proximate match tokens in the order established by the match token sorter satisfies a selected query criterion, and in response to a negative determination to return control to said match token query begin sequence identification control element;

C. a match token query end sequence identifier control module for enabling said processor to, for each positive determination during processing in response to said match token sequence processing control module, determine whether the match token whose query symbol sequence information identifies the match token as having a query symbol corresponding to a final query symbol in the query, the processor, in response to a positive determination by said match token query end identifier, identifying the series of match tokens from the match token for which a positive determination was generated during processing in response to said match token query begin sequence identifier control module to the match token for which a positive determination was generated during processing in response to said match token query end sequence identifier control module as satisfying the query.

10. A text pattern matching system as defined in claim 9 in which each match token includes a proximity value, the proximity value defining a selected proximity relationship with respect to the text symbol sequence information of the previous match token in the order established by the match token sorter, the match token sequence processing control module enabling the processor to use the proximity value in determining whether the document identifier information and the text symbol sequence information of proximate match tokens in the order established by the match token sorter satisfies the selected query criterion.

11. A text pattern matching system for identifying ones of a plurality of documents in a document text base which satisfy a query, each of said documents comprising a series of ordered text symbols, with each text symbol being represented by a text token, each query comprising a series of query symbols, with each query symbol being represented by a query token, said text pattern matching system comprising:

A. a plurality of processing elements, each including a memory including a storage location, each storage location storing data including one of said text tokens or one of said query tokens and a processor for performing processing operations in connection with data stored in said memory;

C. a controller for controlling the operations of said in parallel, the controller including:

i. a match token generator control module for enabling said processors to generate a match token for each text token whose text symbol corresponds to a query token's query symbol, the processors associating each match token with (i) document identifier information identifying one of said documents containing the text symbol corresponding to the query symbol, (ii) text symbol sequence information identifying the position of the text symbol in the series of text symbols which comprise the document, and (iii) query symbol sequence information identifying the position of the query symbol in the series of query symbols which comprise the query, the processors storing each match token so generated in the memory,;

ii. a match token processing control module for enabling said processors to sort in storage locations of a series of processing elements the match tokens generated during processing in response to said match token generating module according to the document identifier information and the text symbol sequence information associated therewith; and iii. a query processing control module for enabling said processors to use the match tokens as ordered during processing in response to said match token processing control module, the processors using the query symbol sequence information associated with the match tokens to identify sequences of match tokens relating to a query which satisfy the query, the processors using the document identifier information of match tokens in the identified sequences of match tokens to identify the documents that satisfy the query.

12. A text pattern matching system as defined in claim 11 in which each text token and each query token further includes a symbol identifier, the symbol identifier in each text token having a value that identifies the text symbol associated therewith and the symbol identifier in each query token having a value that identifies the query symbol associated therewith, the match token generator control module enabling the processors whose memories contain query tokens, processing elements whose memories contain text tokens having symbol identifiers which correspond to the query token's symbol identifier, and to generate a match token for each text token so identified.

13. A text pattern matching system as defined in claim 12 in which the match token generator control module includes:

A. a token sorter control module for enabling said processing elements to perform a sort operation to place the text tokens and the query tokens storage locations in memories of said processing elements in sorted order according to the values of their respective text symbols and query symbols, so that each query token will be in the memory of a processing element that is proximate processing elements whose memories contain said text tokens whose text symbols correspond to the query token's query symbol;

B. a proximate token identifier control module for enabling the processing elements which contain query tokens to, in parallel, identify processing elements successively displaced therefrom which contain text tokens whose text symbol corresponds to the value of the query token's query symbol, in that operation the processors of the processing elements containing query tokens, for each query token, comparing the query token's query symbol to proximate text tokens and identifying those text tokens whose text symbols correspond to the query token's query symbol; and B. a token generator control module for enabling the processor of the processing element containing the query token to generate a match token for each text token identified during processing in response to said proximate token identifier control module.

14. A text pattern matching system as defined in claim 11 in which said query processor control module includes:

A. a text symbol position transfer control module for enabling said processing elements to, in parallel, transfer the document identifier information and the text symbol sequence information from match tokens in their respective memories to proximate processing elements in said series of processing elements;

B. a match determination control module for enabling said processing elements to, in parallel, determine whether the document identifier information and the text symbol sequence information of their respective match tokens and the document identifier information and the text symbol sequence information received during processing in response to said text symbol position transfer control module satisfies a selected query criterion, and to condition criterion satisfied information in response;

C. a query segment identifier control module for enabling said processing elements to, in parallel, determine, for each sub-series of processing elements which contain match tokens, each sub-series being defined as a processing element whose match token contains query symbol sequence information that identifies the match token as having a query symbol corresponding to an initial query symbol in the query, and a match token in a successive processing element in the series of processing elements whose query symbol sequence information identifies the match token as having a query symbol corresponding to a final query symbol in the query, whether the criterion satisfied information of all of the processing elements in the sub-series indicates that the selected query criterion was satisfied, the match tokens for which the processing elements made a positive determination during processing in response to the query segment identifier control module identifying documents that satisfy the query.

15. A method of identifying ones of a plurality of documents in a document text base which satisfy a query, each of said documents comprising a series of ordered text symbols, with each text symbol being represented by a text token, each query comprising query symbols, with each query symbol being represented by a query token, said method comprising the steps of:

A. generating a match token for each text token whose text symbol corresponds to a query token's query symbol, associating each match token with (i) document identifier information identifying one of said documents containing the text symbol corresponding to the query symbol, (ii) text symbol sequence information identifying the position of the text symbol in the series of text symbols which comprise the document, and (iii) query symbol sequence information identifying the position of the query symbol in the series of query symbols which comprise the query;

B. sorting match tokens according to the document identifier information and the text symbol sequence information associated therewith; and C. identify, from the query symbol sequence information associated with the match tokens, sequences of match tokens relating to a query which satisfy the query, the document identifier information of match tokens in the identified sequences of match tokens identifying the documents that satisfy the query.

* * * * *